US010002241B2

(12) United States Patent
Biegun et al.

(10) Patent No.: US 10,002,241 B2
(45) Date of Patent: Jun. 19, 2018

(54) MANAGING DATA TO DIMINISH CROSS-CONTEXT ANALYSIS

(71) Applicant: International Business Machines Corporation, Armonk, NY (US)

(72) Inventors: Arkadiusz W. Biegun, Wola Radziszowska (PL); Tomasz D. Chmielecki, Zielonki (PL); Bartlomiej T. Malecki, Slomniki (PL)

(73) Assignee: International Business Machines Corporation, Armonk, NY (US)

( * ) Notice: Subject to any disclaimer, the term of this patent is extended or adjusted under 35 U.S.C. 154(b) by 205 days.

(21) Appl. No.: 15/163,864

(22) Filed: May 25, 2016

(65) Prior Publication Data
US 2017/0344730 A1    Nov. 30, 2017

(51) Int. Cl.
*G06F 21/31* (2013.01)
*G06F 21/62* (2013.01)

(52) U.S. Cl.
CPC .......... *G06F 21/31* (2013.01); *G06F 21/6218* (2013.01)

(58) Field of Classification Search
CPC .............................. G06F 21/31; G06F 21/6218
See application file for complete search history.

(56) References Cited

U.S. PATENT DOCUMENTS

| | | | |
|---|---|---|---|
| 7,529,710 B1* | 5/2009 | Clower | G06Q 20/10 705/39 |
| 8,225,376 B2 | 7/2012 | Zuckerberg et al. | |
| 8,266,673 B2 | 9/2012 | Hu et al. | |
| 8,595,170 B2* | 11/2013 | Gladstone | G06F 9/468 706/47 |
| 8,832,846 B2 | 9/2014 | Udani | |
| 9,053,327 B2 | 6/2015 | Vandervort | |
| 9,313,100 B1* | 4/2016 | Jenkins | H04L 63/0421 |
| 9,509,672 B1* | 11/2016 | Barak | H04L 63/0815 |
| 2005/0124356 A1* | 6/2005 | Lala | H04W 64/00 455/456.5 |

(Continued)

OTHER PUBLICATIONS

Zheleva, Elena et al., "To Join or Not to Join: The Illusion of Privacy in Social Networks with Mixed Public and Private User Profiles", Proceedings of the 18th International Conference on World Wide Web (WWW'09), Madrid, Spain, Apr. 20-24, 2009, pp. 531-540.

*Primary Examiner* — Michael Pyzocha
(74) *Attorney, Agent, or Firm* — Francis Lammes; Stephen J. Walder, Jr.; Jeffrey S. LaBaw

(57) ABSTRACT

A mechanism is provided for managing user accounts used on the data processing system. A first user account and second user account are initialized. Responsive to a user attempting to perform an activity from a user account in a set of user accounts under which the user is currently logged in, a determination is made as to whether an identifier associated with the activity is associated with a set of identifiers of the user account under which the user is currently logged in. Responsive to the identifier associated with the activity being associated with the set of identifiers of the user account under which the user is currently logged in, the user is allowed access to perform the activity. Responsive to the identifier associated with the activity being associated with a set of identifiers of another user account on the data processing system, the activity is denied.

20 Claims, 3 Drawing Sheets

(56) References Cited

U.S. PATENT DOCUMENTS

| | | | | |
|---|---|---|---|---|
| 2011/0099643 A1* | 4/2011 | Harvey | ............... | G06F 21/6245 |
| | | | | 726/30 |
| 2013/0332361 A1* | 12/2013 | Ciurea | ................. | G06Q 20/405 |
| | | | | 705/44 |
| 2014/0096215 A1* | 4/2014 | Hessler | ............... | H04L 63/0869 |
| | | | | 726/7 |
| 2014/0115712 A1 | 4/2014 | Powell et al. | | |
| 2014/0324988 A1* | 10/2014 | Zhang | .................... | H04L 51/04 |
| | | | | 709/206 |
| 2015/0180874 A1* | 6/2015 | Ootani | .................... | H04L 63/02 |
| | | | | 726/3 |
| 2015/0326550 A1* | 11/2015 | Schropfer | ............... | H04L 63/08 |
| | | | | 726/7 |
| 2016/0088063 A1* | 3/2016 | Cahn | ....................... | H04L 67/30 |
| | | | | 715/751 |
| 2016/0180113 A1* | 6/2016 | Patton | ................. | G06F 21/6245 |
| | | | | 726/28 |
| 2016/0294962 A1* | 10/2016 | Andreev | ............ | G08B 21/0202 |

\* cited by examiner

MANAGING DATA TO DIMINISH CROSS-CONTEXT ANALYSIS

BACKGROUND

The present application relates generally to an improved data processing apparatus and method and more specifically to mechanisms for managing data exposed during communication in order to diminish cross-context analysis.

Mobile devices interact with many services, such as base transceiver stations, near field communications devices, Bluetooth devices, web services through network connections, and the like. The number and types of these services are forever expanding and each service utilizes and collects a set of properties shared by the mobile device, such as hardware identifiers (International Mobile Station Equipment Identity (IMEI), subscriber identity module or subscriber identification module (SIM) identifiers, or the like), activity identifiers (transaction number, Web uniform resource locators (URLs), account names, emails, exchangeable image file (EXIF) formats, or the like), location identifiers (global position system (GPS) position, base transceiver station (BTS) connections, internet protocol (IP) addresses, media access control (MAC) address, network interface card (NIC) identifier, or the like), and many others.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for managing user accounts used on the data processing system. The illustrative embodiment initializes a first user account and a second user account, where a first set of identifiers is stored in the first user account and a second set of identifiers is stored in the second user account and where the first set of identifiers and the second set of identifiers are disjointed. Responsive to a user attempting to perform an activity from a user account in a set of user accounts under which the user is currently logged in, the illustrative embodiment determines whether an identifier associated with the activity is associated with a set of identifiers of the user account under which the user is currently logged in. Responsive to the identifier associated with the activity being associated with the set of identifiers of the user account under which the user is currently logged in, the illustrative embodiment allows the user access to perform the activity. Responsive to the identifier associated with the activity failing to be associated with the set of identifiers of the user account under which the user is currently logged in, the illustrative embodiment determines whether the identifier is associated with a set of identifiers of other user accounts on the data processing system. Responsive to the identifier associated with the activity being associated with a set of identifiers of another user account on the data processing system, the illustrative embodiment denies the activity from being performed by the user of the user account under which the user is currently logged in.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
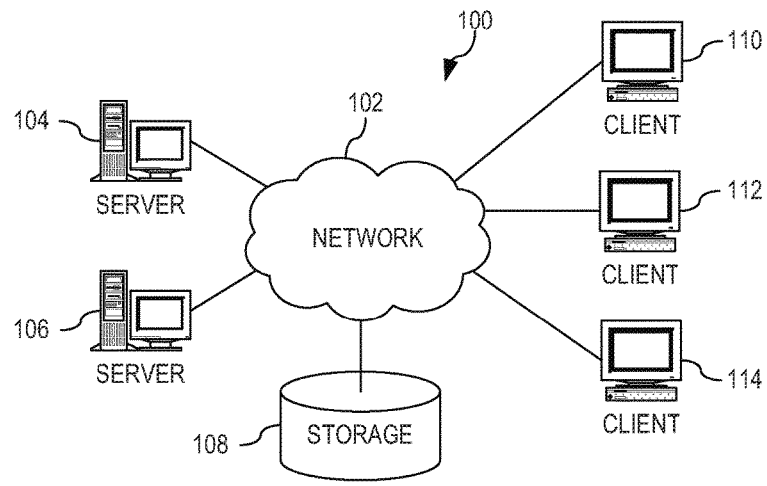
FIG. 1 is an example diagram of a distributed data processing system in which aspects of the illustrative embodiments may be implemented.

The illustrative embodiments provide mechanisms for managing data exposed during communication in order to diminish cross-context analysis, i.e. data, both public and private, that makes cross-context analysis possible. As noted above, mobile devices share properties of the mobile device, such as hardware identifiers (International Mobile Station Equipment Identity (IMEI), subscriber identity module or subscriber identification module (SIM) identifiers, or the like), activity identifiers (transaction number, Web uniform resource locators (URLs), account names, emails, exchangeable image file (EXIF) formats, or the like), location identifiers (global position system (GPS) position, base transceiver station (BTS) connections, internet protocol (IP) addresses, media access control (MAC) address, network interface card (NIC) identifier, or the like), and many others. These properties are stored on the server or client side and may be used at any time to generate personalized or other contextually tuned actions for or against the user of the mobile device. Thus, it is possible a cross-context analysis will be performed, using commonly used identifiers shared by the mobile device. Such a cross-context analysis may discover other fields of user activity and assemble such fields to generate a full profile of the user, containing traces of the user's activities, which may be used for much more aggressive and complete actions such as like cross-context advertisement.

The illustrative embodiments provide a data management mechanism that manages data exposed during communication in order to diminish cross-context analysis. In accordance with the illustrative embodiments, data is any data, identifier, label, property, or the like, used by the user thereby allowing an association of different transactions, sessions, activities, or the like, which may be assigned to a person or other activity agent. Based on a user's login credentials, the mechanisms identify each piece of data exposed during any communication and place information or identifiers (IDs) associated with the data into a privacy profile associated with the user's login. If a device has more than one user account, the mechanisms provide protections for any common activities between the privacy profiles created for each user account. If a common activity is requested by a user, the mechanisms provide a risk assessment as to having such a common activity and a notification is provided to the user prior to performing the activity. Identifiers associated with the hardware or operating system of the mobile device itself that are common to all logins are created automatically and kept in a separate device profile separate from the privacy profiles.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general-purpose hardware, software instructions stored on a medium such that the instructions are readily executable by specialized or general-purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
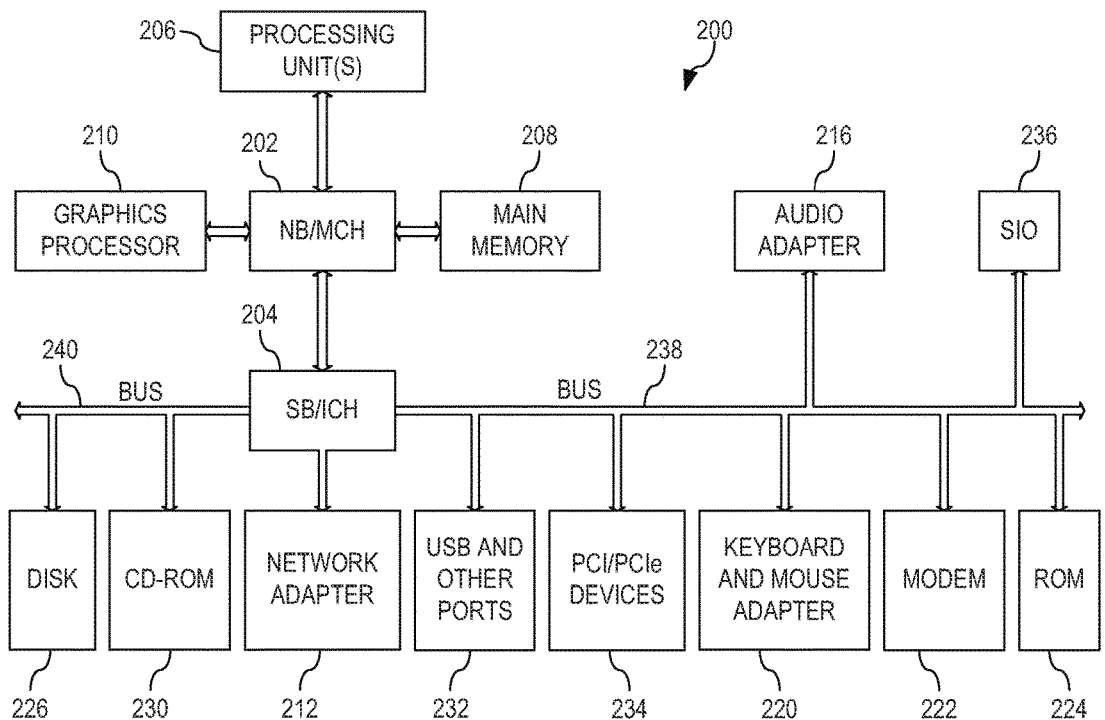
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement a data management mechanisms that manages data exposed during communication in order to diminish cross-context analysis. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates managing data exposed during communication in order to diminish cross-context analysis.

As noted above, the mechanisms of the illustrative embodiments utilize specifically configured computing devices, or data processing systems, to perform the operations for managing data exposed during communication in order to diminish cross-context analysis. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to a data management mechanisms that manages data exposed during communication in order to diminish cross-context analysis.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
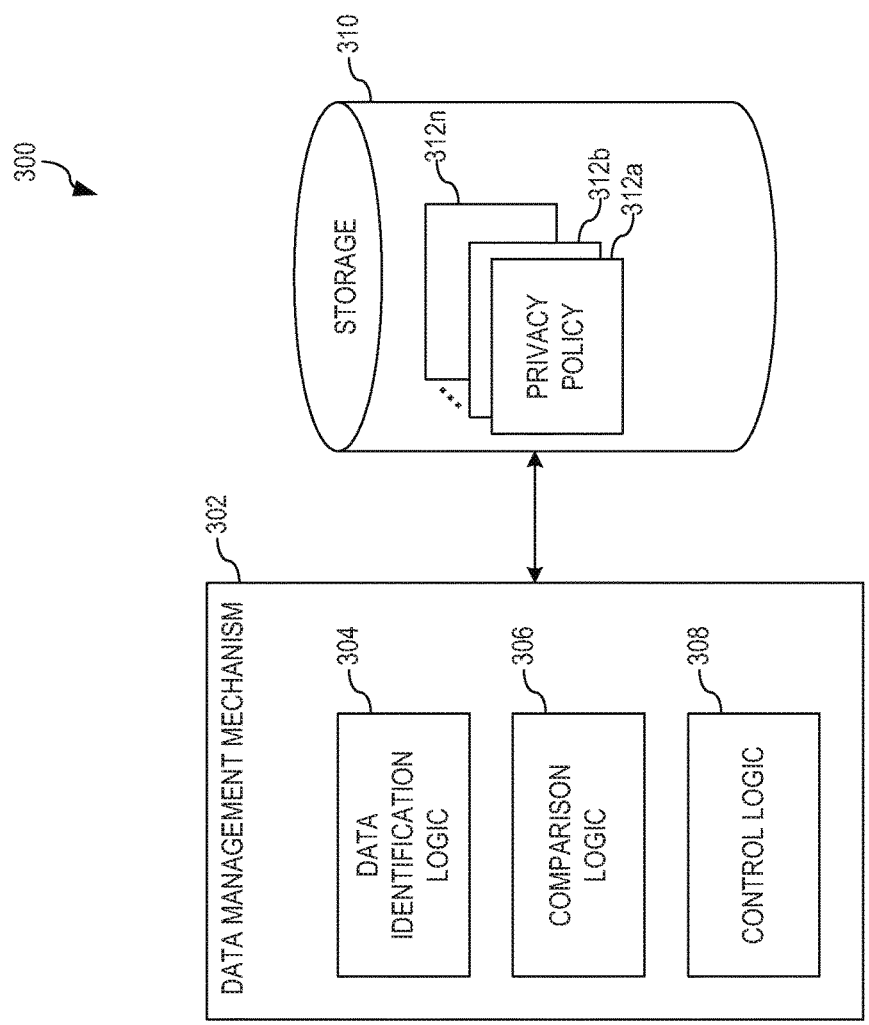
FIG. 3 depicts a functional block diagram of a data management mechanism that manages data exposed during communication in order to diminish cross-context analysis in accordance with an illustrative embodiment.

FIG. 3 depicts a functional block diagram of a data management mechanism that manages data exposed during communication in order to diminish cross-context analysis in accordance with an illustrative embodiment. Data management mechanism 302 operates within data processing system 300, which is a data processing system such as data processing system 200 of FIG. 2. Data management mechanism 302 comprises data identification logic 304, comparison logic 306, control logic 308, and storage 310. In operation, a user logs into data processing system 300 and, based on the user's login credentials, i.e. a user account and password, control logic 308 generates first privacy policy 312*a* associated with the user account. For example, when a user using a laptop logs into the laptop using a business user account and password, control logic 308 of the data management mechanism 302 installed on the laptop would generate a business privacy policy 312*a* for the user's business activities. Thus, each time a user logs into data processing system 300, for each unique user account, control logic 308 generates a unique privacy policy 312*a*-312*n* associated with the unique user account. In following with the example above, if the same user logs into the laptop using a personal user account and password, control logic 308 would generate a second privacy policy 312*b* for the user's personal activities. Continuing with the example, if the user's child were to log into the laptop using a the child's user account and password, control logic 308 would generate a third privacy policy 312*c* for the child's personal activities.

Once control logic 308 generates a privacy policy associated with the user's account, then as the user performs activities on data processing system 300, data identification logic 304 monitors the activities to identify data, identifiers, labels, properties, or the like, used by the user in association with the different activities performed by the user, such as activity identifiers (transaction numbers, Web uniform resource locators (URLs), account names, emails, exchangeable image file (EXIF) formats, or the like), location identifiers (global position system (GPS) position, base transceiver station (BTS) connections, internet protocol (IP) addresses, media access control (MAC) address, network interface card (NIC) identifiers, or the like), and other identifiers. The exemplified activity identifiers and location identifiers are only examples of the identifiers that may be identified and the present invention is not limited to only these examples. That is, the illustrative embodiments recognize that any type of identifier associated with any type of activity performed by the user on data processing system 300 may be identified by data identification logic 304 and that the identifier may be checked for data that should be limited in association with the privacy of the user account.

Thus, as the user performs such an activity, data identification logic 304 identifies an identifier associated with the activity and comparison logic 306 determines whether the identifier already exists within the privacy policy of the current user account. Responsive to comparison logic 306 determining that the identifier associated with the activity already exists in the privacy policy of the user account under which the user is currently logged in, control logic 308 allows the user to perform the activity. Responsive to comparison logic 306 determining that the identifier of the activity that is intending to be performed fails to be associated with a privacy policy of the user account under which the user is currently logged in, comparison logic 306 determines whether the identifier is associated with another privacy policy in a set of privacy policies of other user accounts on data processing system 300. Responsive to comparison logic 306 determining that the identifier is associated with another privacy policy of another user account on data processing system 300, control logic 308 denies the activity from being performed by the current user under the current user account.

As an example of the above, if a user is logged into a business account and is attempting to access a business email program, data identification logic 304 identifies the identifier associated with the business email program, comparison logic 306 compares the identifier to the identifier in the privacy policy associated with the business account, and, if the identifier is present, control logic 308 allows the user to access the business email account. However, if the user is logged into the business account and attempts to access a personal email program, data identification logic 304 identifies the identifier associated with the personal email program and comparison logic 306 compares the identifier to the identifier in the privacy policy associated with the business account. If comparison logic 306 fails to identify the identifier of the personal email account in the privacy policy associated with the business account but does identify the identifier associated with the personal email account in a privacy policy associated with the personal account, then, since the identifier is in the privacy policy associated with the personal account, control logic 308 denies the access to the personal email account by the user from the currently logged into business account.

Continuing with the description of the illustrative embodiments, if comparison logic 306 fails to locate the identifier in any other privacy policy in the set of privacy policies of the other user accounts on data processing system 300, then control logic 308 may handle the new identifier in two ways. That is, in one embodiment, responsive to the identifier associated with the activity failing to be associated with any other privacy policy in the set of privacy policies of the other user accounts on data processing system 300, depending on a set of predetermined preferences, control logic 308 may automatically add the identifier to the privacy policy of the currently logged into user account and allow the user to perform the activity. In another embodiment, responsive to the identifier associated with the activity failing to be associated with any other privacy policy in the set of privacy policies of the other user accounts on data processing system 300, depending on the set of predetermined preferences, control logic 308 may prompt the user for approval to add the identifier to the privacy policy of the currently logged into user account. Responsive to the user providing an indication of approval, control logic 308 adds the identifier to the privacy policy of the currently logged into user account and allows the user to perform the activity. Responsive to the user providing an indication of disapproval, control logic 308 denies the activity from being performed by the current user under the current user account.

In one embodiment, the illustrative embodiments provide for a user to perform an activity even though the identifier of the activity fails to be associated with the privacy policy of the user account under which the user is currently logged in or any set of identifiers of the other user accounts in data processing system 300. That is, the illustrative embodiments provide for the user to perform an activity even when the identifier is not recorded within data processing system 300 using a temporary account. Responsive to comparison logic 306 determining that the identifier of the activity that is intended to be performed fails to be associated with the privacy policy of the user account under which the user is currently logged in, and responsive to comparison logic 306 determining that the identifier associated with the activity fails to be associated with any set of identifiers of the other user accounts on the data processing system, control logic 308 prompts the user for approval to add the identifier associated with the activity to the user account. Responsive to the user providing an indication of disapproval, control logic 308 determines whether the user still wants to perform the activity without adding the identifier associated with the activity to the set of information associated with the user account. Responsive to the user providing an indication to perform the activity without adding the identifier associated with the activity to the set of information associated with the user account, control logic 308 logs the user off of the user account under which the user is currently logged in, opens a temporary user account in order to perform the activity, the temporary user account not having a set of identifiers, and allows the user access to perform the activity without adding the identifier of the activity to any set of identifiers associated with any other user account.

In a further embodiment, data management mechanism 302 provides for the sharing of identifiers between user accounts. For example, between a parent's account and a child's account, the parent may have access to all or a portion of the identifiers in the privacy policy of the child's account, but the child may not have access to any of the identifiers in the parents account. In another example, between a husband's account and a wife's account, the husband may have access to all or a portion of the identifiers in the privacy policy of the wife's account, and the wife may have access to all or a portion of the identifiers in the privacy policy of the husband's account. Thus, a first user account may have access to the identifiers of another user account even though the other user account may or may not have access to the identifiers of the first user account.

Thus, the illustrative embodiments provide privacy profiles that each shield an associated user account preventing the possibility to associate activities of one user account with identifiers of other user account unless identified by user preferences. That is, each privacy profile controls which activity identifiers are exposed and which activity identifiers are shared with other privacy profiles. Full separation of privacy profiles denote that no identifiers in one privacy profile associated with one user account may be utilized by another user account. Partial separation privacy profiles denote that some or all chosen identifiers in one privacy profile associated with one user account may be utilized by another user account.

Therefore, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
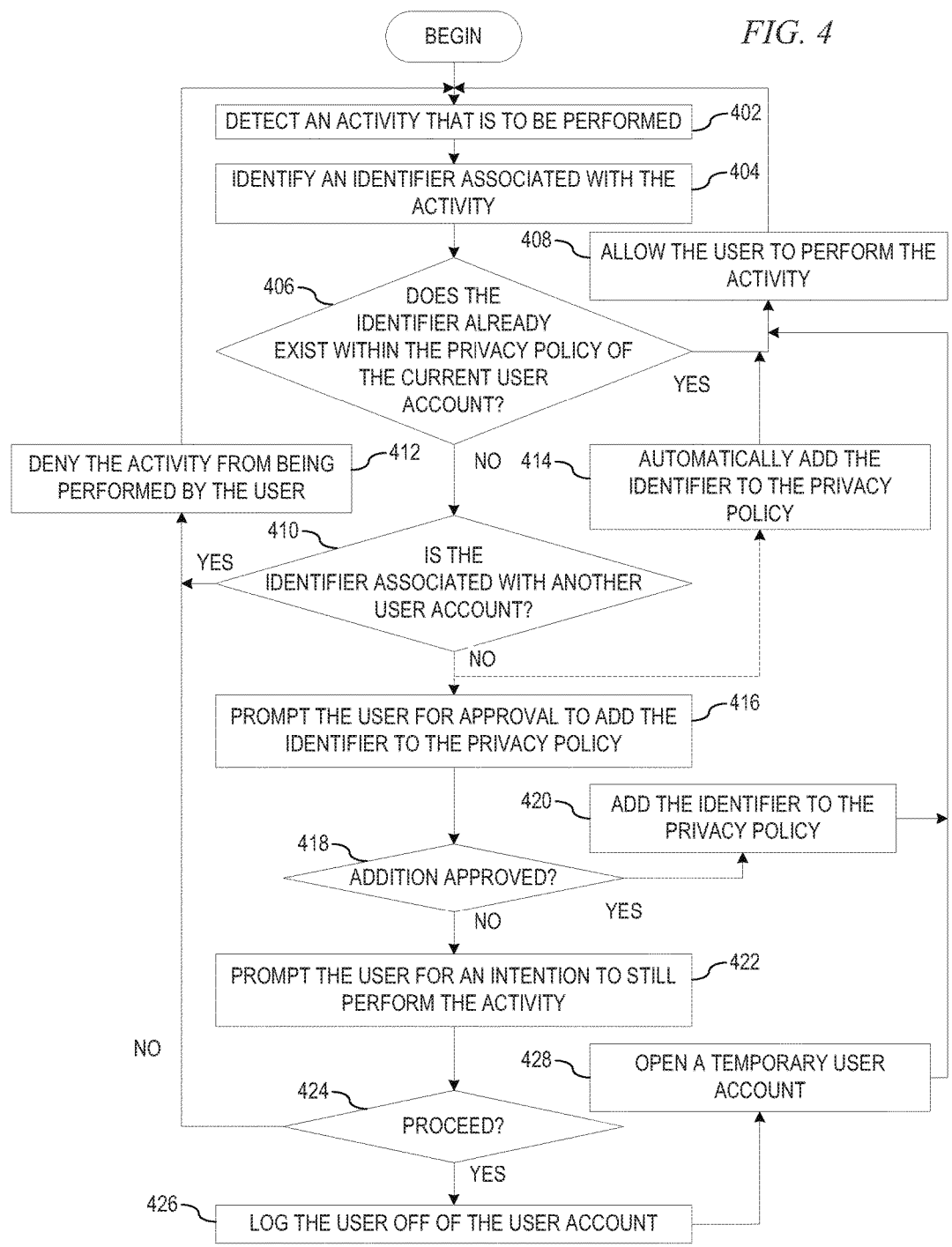
FIG. 4 depicts a flow diagram of the operation performed by a data management mechanism that manages data exposed during communication in a data processing system in order to diminish cross-context analysis in accordance with an illustrative embodiment.

FIG. 4 depicts a flow diagram of the operation performed by a data management mechanism that manages data exposed during communication in a data processing system in order to diminish cross-context analysis in accordance with an illustrative embodiment. As the operation begins, the data management mechanism operating within the data processing system detects an activity that is to be performed on the data processing system (step 402). Responsive to detecting the activity, the data management mechanism identifies an identifier associated with the activity (step 404) and determines whether the identifier already exists within the privacy policy of the current user account (step 406). That is, each activity has associated data, identifiers, labels, properties, or the like, referred to collectively as identifiers, used by the user in association with the different activities performed by the user, such as activity identifiers (transaction numbers, Web uniform resource locators (URLs), account names, emails, exchangeable image file (EXIF) formats, or the like), location identifiers (global position system (GPS) position, base transceiver station (BTS) connections, internet protocol (IP) addresses, media access control (MAC) address, network interface card (NIC) identifiers, or the like), and other identifiers.

If at step 406 the data management mechanism determines that the identifier associated with the activity already exists in the privacy policy of the user account under which the user is currently logged in, the data management mechanism allows the user to perform the activity (step 408), with the operation returning to step 402 thereafter. If at step 406 the data management mechanism determines that the identifier of the activity that is intending to be performed fails to be associated with a privacy policy of the user account under which the user is currently logged in, the data management mechanism determines whether the identifier is associated with another privacy policy in a set of privacy policies of other user accounts on the data processing system (step 410). If at step 410 the data management mechanism determines that the identifier is associated with another privacy policy of another user account on the data processing system, the data management mechanism denies the activity from being performed by the current user under the current user account (step 412), with the operation returning to step 402 thereafter.

If at step 410 the data management mechanism fails to locate the identifier in any other privacy policy in the set of privacy policies of the other user accounts on the data processing system, then the data management mechanism may proceed in one of two different ways depending on a set of predetermined preferences. If the set of predetermined preferences indicate to automatically add the new identifiers, then the data management mechanism automatically adds the identifier to the privacy policy of the currently logged into user account (step 414), with the operation proceeding to step 408 thereafter. If the set of predetermined preferences indicate to verify an addition of a new identifier, then the data management mechanism prompts the user for approval to add the identifier to the privacy policy of the currently logged into user account (step 416). The data management mechanism then determines whether the user has approved the addition of the identifier to the privacy policy of the currently logged into user account (step 418). If at step 418 the user has approved of the addition of the identifier to the privacy policy of the currently logged into user account, then the data management mechanism adds the identifier to the privacy policy of the currently logged into user account (step 420), with the operation proceeding to step 408 thereafter.

If at step 418 the user has disapproved of the addition of the identifier to the privacy policy of the currently logged into user account, the data management mechanism prompts the user for an intention to still perform the activity with a warning that the proceeding with the activity will cause the user to be transferred to a temporary user account (step 422). The data management mechanism then determines whether the user has approved proceeding with the activity (step 424). If at step 424 the user provides an indication not to proceed, then the operation proceeds to step 412. If at step 424 the user provides an indication to proceed, the data management mechanism logs the user off of the user account under which the user is currently logged in (step 426) and opens a temporary user account in order to perform the activity (step 428), the temporary user account not having a privacy policy or a set of identifiers. From step 428, the operation proceeds to step 408.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for data management mechanisms that manage data exposed during communication in order to diminish cross-context analysis. For any data processing system hosting multiple user accounts, the mechanisms provide protections for any common activities between the privacy profile created for each user account. If a common activity is requested by a particular user, the mechanisms provide a risk assessment as to having such a common activity, and a notification indicating the common activity between privacy profiles is provided to the user prior to allowing the user to access the common activity. Identifiers associated with the hardware or operating system of the mobile device itself that are common to all logins are created automatically and kept in a separate device profile separate from the privacy profiles.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for managing user accounts used on the data processing system, the method comprising:
    initializing a first user account and a second user account, wherein a first set of identifiers is stored in the first user account and a second set of identifiers is stored in the second user account and wherein the first set of identifiers and the second set of identifiers are disjointed;
    responsive to a user attempting to perform an activity from a user account in a set of user accounts under which the user is currently logged in, determining whether an identifier associated with the activity is associated with a set of identifiers of the user account under which the user is currently logged in;
    responsive to the identifier associated with the activity being associated with the set of identifiers of the user account under which the user is currently logged in, allowing the user access to perform the activity;
    responsive to the identifier associated with the activity failing to be associated with the set of identifiers of the user account under which the user is currently logged in, determining whether the identifier is associated with a set of identifiers of other user accounts on the data processing system; and
    responsive to the identifier associated with the activity being associated with a set of identifiers of another user account on the data processing system, denying the activity from being performed by the user of the user account under which the user is currently logged in.

2. The method of claim 1, further comprising:
    responsive to the identifier associated with the activity failing to be associated with any set of identifiers of the other user accounts on the data processing system, automatically adding the piece of information to the set of information associated with the user account; and
    allowing the user access to perform the activity.

3. The method of claim 1, further comprising:
    responsive to the identifier associated with the activity failing to be associated with any set of identifiers of the other user accounts on the data processing system, prompting the user for approval to add the identifier associated with the activity to the user account;
    responsive to the user providing an indication of approval, adding the identifier associated with the activity to a set of information associated with the user account; and
    allowing the user access to perform the activity.

4. The method of claim 3, further comprising:
    responsive to the user providing an indication of disapproval, denying the activity from being performed by the user of the user account under which the user is currently logged in.

5. The method of claim 1, further comprising:
    responsive to the identifier associated with the activity failing to be associated with any set of identifiers of the other user accounts on the data processing system, prompting the user for approval to add the identifier associated with the activity to the user account; and responsive to the user providing an indication of disapproval, prompting the user for an indication to perform the activity without adding the identifier associated with the activity to the set of information associated with the user account; and responsive to the user providing an indication to perform the activity without adding the identifier associated with the activity to the set of information associated with the user account:

logging the user off of the user account under which the user is currently logged in;

opening a temporary user account in order to perform the activity, wherein the temporary user account does not have a set of identifiers; and allowing the user access to perform the activity without adding the identifier of the activity to any set of identifiers associated with any other user account.

6. The method of claim 1, wherein the second user account has an additional user account that is authorized to share identifiers stored in the second user account.

7. The method of claim 1, wherein the first set of identifiers and the second set of identifiers are sets of data and the sets of data comprise data, identifiers, labels, or properties associated with at least one of transactions, sessions, or activities performed by the user.

8. A computer program product comprising a computer readable storage medium having a computer readable program stored therein, wherein the computer readable program, when executed on a computing device, causes the computing device to:

initialize a first user account and a second user account, wherein a first set of identifiers is stored in the first user account and a second set of identifiers is stored in the second user account and wherein the first set of identifiers and the second set of identifiers are disjointed;

responsive to a user attempting to perform an activity from a user account in a set of user accounts under which the user is currently logged in, determine whether an identifier associated with the activity is associated with a set of identifiers of the user account under which the user is currently logged in;

responsive to the identifier associated with the activity being associated with the set of identifiers of the user account under which the user is currently logged in, allow the user access to perform the activity;

responsive to the identifier associated with the activity failing to be associated with the set of identifiers of the user account under which the user is currently logged in, determine whether the identifier is associated with a set of identifiers of other user accounts on the data processing system; and responsive to the identifier associated with the activity being associated with a set of identifiers of another user account on the data processing system, deny the activity from being performed by the user of the user account under which the user is currently logged in.

9. The computer program product of claim 8, wherein the computer readable program further causes the computing device to:

responsive to the identifier associated with the activity failing to be associated with any set of identifiers of the other user accounts on the data processing system, automatically add the piece of information to the set of information associated with the user account; and allow the user access to perform the activity.

10. The computer program product of claim 8, wherein the computer readable program further causes the computing device to:

responsive to the identifier associated with the activity failing to be associated with any set of identifiers of the other user accounts on the data processing system, prompt the user for approval to add the identifier associated with the activity to the user account;

responsive to the user providing an indication of approval, add the identifier associated with the activity to a set of information associated with the user account; and allow the user access to perform the activity.

11. The computer program product of claim 10, wherein the computer readable program further causes the computing device to:

responsive to the user providing an indication of disapproval, deny the activity from being performed by the user of the user account under which the user is currently logged in.

12. The computer program product of claim 8, wherein the computer readable program further causes the computing device to:

responsive to the identifier associated with the activity failing to be associated with any set of identifiers of the other user accounts on the data processing system, prompt the user for approval to add the identifier associated with the activity to the user account; and responsive to the user providing an indication of disapproval, prompting the user for an indication to perform the activity without adding the identifier associated with the activity to the set of information associated with the user account; and responsive to the user providing an indication to perform the activity without adding the identifier associated with the activity to the set of information associated with the user account:

log the user off of the user account under which the user is currently logged in;

open a temporary user account in order to perform the activity, wherein the temporary user account does not have a set of identifiers; and allow the user access to perform the activity without adding the identifier of the activity to any set of identifiers associated with any other user account.

13. The computer program product of claim 8, wherein the second user account has an additional user account that is authorized to share identifiers stored in the second user account.

14. The computer program product of claim 8, wherein the first set of identifiers and the second set of identifiers are sets of data and the sets of data comprise data, identifiers, labels, or properties associated with at least one of transactions, sessions, or activities performed by the user.

15. An apparatus comprising:

a processor; and a memory coupled to the processor, wherein the memory comprises instructions which, when executed by the processor, cause the processor to:

initialize a first user account and a second user account, wherein a first set of identifiers is stored in the first user account and a second set of identifiers is stored in the second user account and wherein the first set of identifiers and the second set of identifiers are disjointed;

responsive to a user attempting to perform an activity from a user account in a set of user accounts under which the user is currently logged in, determine whether an identifier associated with the activity is associated with a set of identifiers of the user account under which the user is currently logged in;

responsive to the identifier associated with the activity being associated with the set of identifiers of the user account under which the user is currently logged in, allow the user access to perform the activity;

responsive to the identifier associated with the activity failing to be associated with the set of identifiers of the user account under which the user is currently logged in, determine whether the identifier is associated with a set of identifiers of other user accounts on the data processing system; and responsive to the identifier associated with the activity being associated with a set of identifiers of another user account on the data processing system, deny the activity from being performed by the user of the user account under which the user is currently logged in.

16. The apparatus of claim 15, wherein the instructions further cause the processor to:

responsive to the identifier associated with the activity failing to be associated with any set of identifiers of the other user accounts on the data processing system, automatically add the piece of information to the set of information associated with the user account; and allow the user access to perform the activity.

17. The apparatus of claim 15, wherein the instructions further cause the processor to:

responsive to the identifier associated with the activity failing to be associated with any set of identifiers of the other user accounts on the data processing system, prompt the user for approval to add the identifier associated with the activity to the user account;

responsive to the user providing an indication of approval, add the identifier associated with the activity to a set of information associated with the user account; and allow the user access to perform the activity.

18. The apparatus of claim 17, wherein the instructions further cause the processor to:

responsive to the user providing an indication of disapproval, deny the activity from being performed by the user of the user account under which the user is currently logged in.

19. The apparatus of claim 15, wherein the instructions further cause the processor to:

responsive to the identifier associated with the activity failing to be associated with any set of identifiers of the other user accounts on the data processing system, prompt the user for approval to add the identifier associated with the activity to the user account; and responsive to the user providing an indication of disapproval, prompting the user for an indication to perform the activity without adding the identifier associated with the activity to the set of information associated with the user account; and responsive to the user providing an indication to perform the activity without adding the identifier associated with the activity to the set of information associated with the user account:

log the user off of the user account under which the user is currently logged in;

open a temporary user account in order to perform the activity, wherein the temporary user account does not have a set of identifiers; and allow the user access to perform the activity without adding the identifier of the activity to any set of identifiers associated with any other user account.

20. The apparatus of claim 15, wherein the second user account has an additional user account that is authorized to share identifiers stored in the second user account.

* * * * *